United States Patent
Mayer et al.

(10) Patent No.: US 6,685,190 B1
(45) Date of Patent: Feb. 3, 2004

(54) VENTILATED TRICKLE SEAL

(75) Inventors: Robert Russell Mayer, Schenectady, NY (US); Bharat Sampathkumaran Bagepalli, Niskayuna, NY (US); Mahmut Faruk Aksit, Troy, NY (US)

(73) Assignee: General Electric Company, Schenectady, NY (US)

( * ) Notice: Subject to any disclaimer, the term of this patent is extended or adjusted under 35 U.S.C. 154(b) by 235 days.

(21) Appl. No.: 09/690,345

(22) Filed: Oct. 17, 2000

(51) Int. Cl.⁷ .............................................. F16J 15/447
(52) U.S. Cl. ...................................................... 277/355
(58) Field of Search ......................................... 277/355

(56) References Cited

U.S. PATENT DOCUMENTS

| | | | | | |
|---|---|---|---|---|---|
| 3,571,635 A | * | 3/1971 | Turner | ......................... | 310/258 |
| 4,281,838 A | * | 8/1981 | Persson | ....................... | 277/355 |
| 4,531,070 A | * | 7/1985 | Kuhn | ........................... | 310/56 |
| 4,756,536 A | | 7/1988 | Belcher | | |
| 4,924,817 A | * | 5/1990 | Seelen | ........................ | 122/379 |
| 5,090,710 A | * | 2/1992 | Flower | ........................ | 277/355 |
| 5,106,104 A | * | 4/1992 | Atkinson et al. | ............ | 277/303 |
| 5,400,952 A | * | 3/1995 | Hetico | ......................... | 228/177 |
| 5,474,305 A | * | 12/1995 | Flower | ........................ | 277/355 |
| 5,548,174 A | * | 8/1996 | Siga et al. | ................... | 310/261 |
| 6,082,740 A | | 7/2000 | Jones et al. | | |
| 6,126,726 A | * | 10/2000 | Foley et al. | ..................... | 95/56 |
| 6,257,588 B1 | * | 7/2001 | Bagepalli et al. | .............. | 160/40 |
| 6,406,027 B1 | * | 6/2002 | Aksit et al. | .................. | 277/355 |

OTHER PUBLICATIONS

U.S. Application No. 09/586045 of Mayer et al.
U,S, Application No. 09/586044 of Mayer et al.

* cited by examiner

*Primary Examiner*—Anthony Knight
*Assistant Examiner*—John L. Beres
(74) *Attorney, Agent, or Firm*—Nixon & Vanderhye PC

(57) ABSTRACT

A seal is provided around a shaft extending through a cavity in a hydrogen cooled generator. The seal includes a plurality of brush seal structures adapted to reduce flow to/from the cavity to a level where the risk of creating an explosive mixture of gases is minimized. In an embodiment of the invention, a series of brush seals are provided to interface with the rotary shaft so as to define a seal for minimizing the flow of hydrogen out of the cavity. In one preferred embodiment, the seal is composed of first and second brush seal assemblies, each of which is comprised of a plurality of brush seal structures. In another embodiment, spring(s) are provided to urge the brush seal structures into sealing engagement with the rotor. If deemed necessary or desirable, a vent outlet is provided in a cavity wall remote from the hydrogen atmosphere, to remove hydrogen that has leaked through the brush seals.

23 Claims, 3 Drawing Sheets

VENTILATED TRICKLE SEAL

BACKGROUND OF THE INVENTION

This invention relates to a seal for hydrogen-cooled generators and more specifically to a ventilated trickle seal provided as a low leakage seal for hydrogen-cooled generators that relies on a relatively wide region of brush seals to reduce hydrogen leakage. The invention further relates to a low leakage seal in which any leakage gas is disbursed using shop air to ventilate the region of gas release.

Hydrogen has been widely used as a coolant in a variety of rotary electric machines due to its desirable thermophysical properties including low density and specific heat. However, a disadvantage of using hydrogen is that the hydrogen purity must be maintained above its explosive limit (74% hydrogen in air). Therefore, a significant consideration for safe operation of hydrogen cooled rotary machines, such as turbogenerators is designing highly reliable and efficient hydrogen seal systems therefor. In a hydrogen cooled turbogenerator, hydrogen seals are utilized both to seal high pressure hydrogen at the interface of the rotating shaft and to prevent air from entering the casing and from developing an explosive mixture with the hydrogen. Such sealing must be provided at all static joints of the machine as well as at the interface between the rotor and the stator at both ends of the machine.

Another consideration is the total amount of hydrogen that must be supplied to the machine. While this is not as serious a concern as an explosive situation, it represents a constant expense that adds to the total cost of generating electricity.

Current hydrogen-cooled generators utilize an oil film seal to create a zero leakage seal across the interface between the stator and the rotor at both ends of the machine. See in this regard U.S. Pat. No. 6,082,740; copending application Ser. No. 09/586,044; co-pending application Ser. No. 09/586,045, and co-pending application Ser. No. 09/668452, filed Sep. 25, 2000; the disclosures of each of which are incorporated herein by this reference. While the seal has essentially no leakage across it, oil that enters the machine casing becomes saturated with hydrogen gas, resulting in hydrogen consumption.

Several manufacturers, such as Siemans and ABB, use a complex system involving seal rings isolated from the casing by a secondary set of seals. This two-layer seal system reduces the amount of oil that enters the machine casing, but it requires more space within the machine as well as pumps and plumbing resulting in a high initial cost. Other manufacturers, such as General Electric, use a much simpler system with bearing lube oil being used to feed the seal oil system and a relatively simple set of rings where the hydrogen side oil can directly mix with casing gases. This system thus has a lower initial cost. However, due to the hydrogen consumption noted above, ongoing hydrogen costs would be higher than, for example, the more complex systems noted above. A need remains, therefore, for a seal for hydrogen cooled generators that can maintain non-explosive hydrogen conditions at all times, minimize hydrogen consumption, and reduce or eliminate complex auxiliary support hardware.

BRIEF SUMMARY OF THE INVENTION

The invention is embodied in a seal provided around a shaft extending through a pressurized cavity. In contrast to current seal strategies in which zero leakage is allowed outside of the system, the seal of the invention is adapted to reduce flow to/from the cavity to a level where the risk of creating an explosive mixture of gases is minimized. Thus, with the seal of the invention a minimum amount of leakage is permitted through the seals The seal of the invention provides a plurality of brush seal structures to minimize the flow of hydrogen out of the cavity. In an embodiment of the invention, a series of brush seals are provided to interface with a rotary shaft so as to define a seal for minimizing the flow of hydrogen out of the cavity. In one preferred embodiment, the seal is composed of first and second brush seal assemblies, each comprised of a plurality of brush seal structures, one assembly being provided on each side of a step in the exterior surface of the rotary shaft. In another embodiment, spring(s) are provided to urge the brush seal structures into sealing engagement with the rotor.

DETAILED DESCRIPTION OF THE INVENTION

Figure 1:
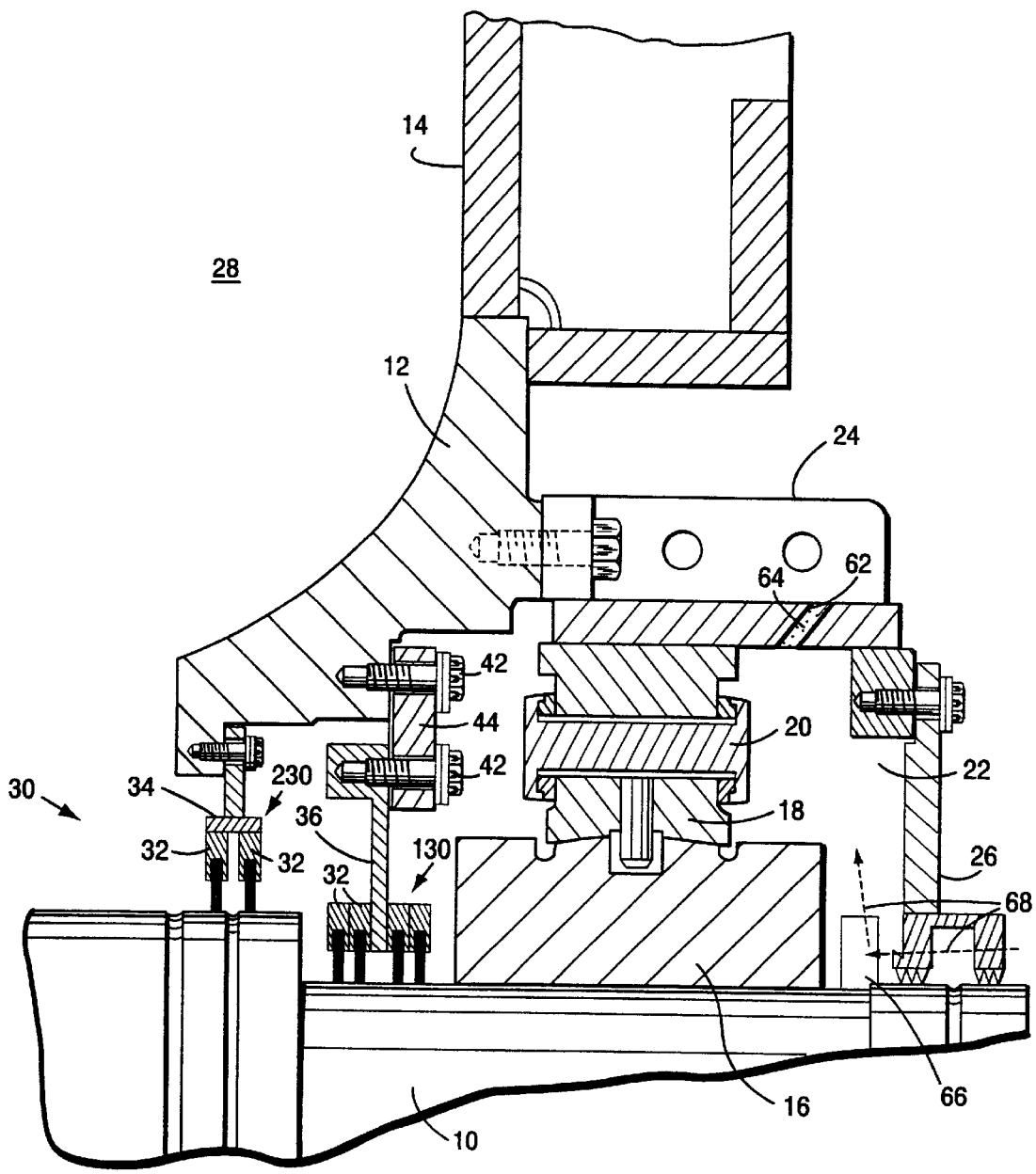
FIG. 1 is a fragmentary cross-sectional view of a ventilated trickle seal between a housing wall and a rotor of a hydrogen cooled generator constructed according to an embodiment of the invention.

Referring now to the drawings, particularly to FIG. 1, an end portion of a hydrogen cooled generator having a rotor 10, a housing wall or casing 12 and a portion of an end shield 14 are illustrated. Also illustrated is a rotor shaft bearing 16 comprised of inner and outer bearing rings 18 and 20, respectively, disposed in a bearing cavity 22 containing an oil mist. A bearing cap 24, together with an end oil deflector 26, closes off outside portions of the oil bearing cavity 22 about rotor 10.

Along the inside surface of housing wall 12 (to the left of wall 12 in FIG. 1), there is a hydrogen atmosphere, designated with reference numeral 28, within the generator for cooling the generator. The invention is embodied in at least one brush seal assembly, as generally shown at 30 in FIG. 1, that is provided between the rotor 10 and the housing wall or casing 12 to maintain the hydrogen atmosphere 28 segregated from the oil mist in bearing cavity 22. In the embodiment illustrated in FIG. 1, a conventional seal casing having seal rings disposed therewithin has been omitted in its entirety.

Figure 2:
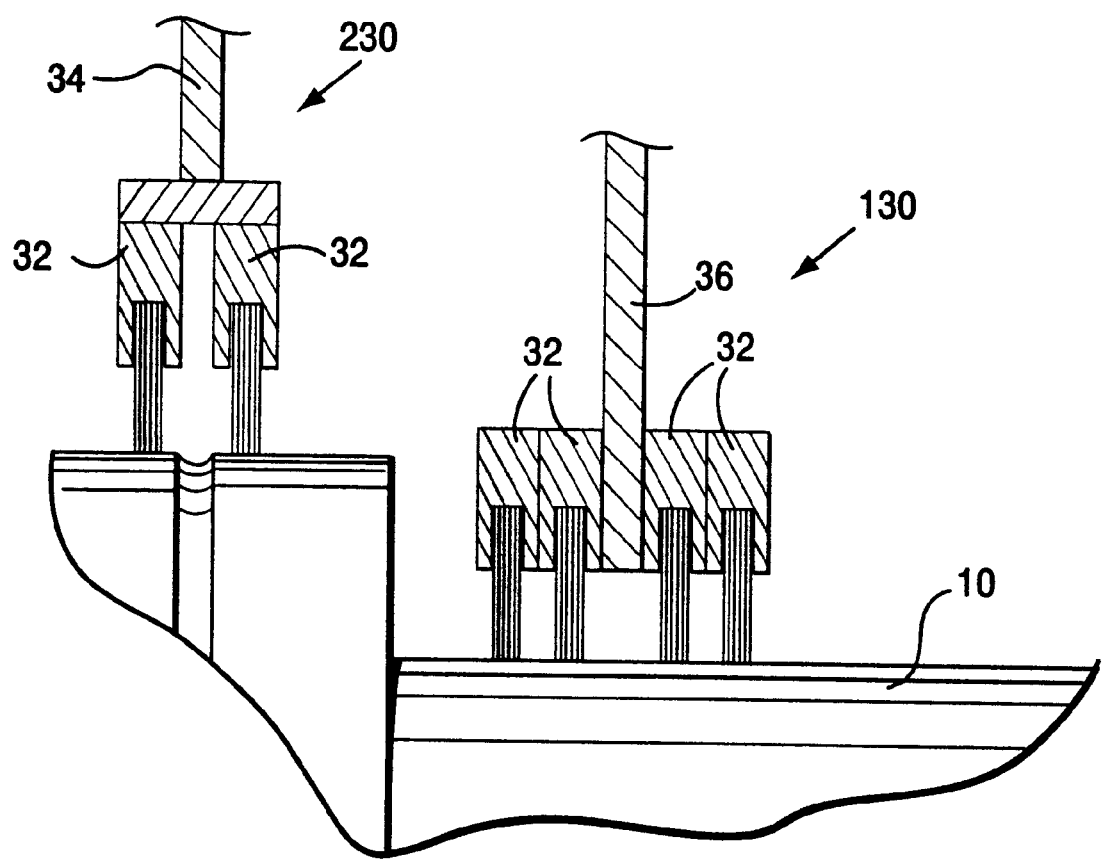
FIG. 2 is an enlarged schematic cross-sectional view of the seal of FIG. 1.
Figure 3:
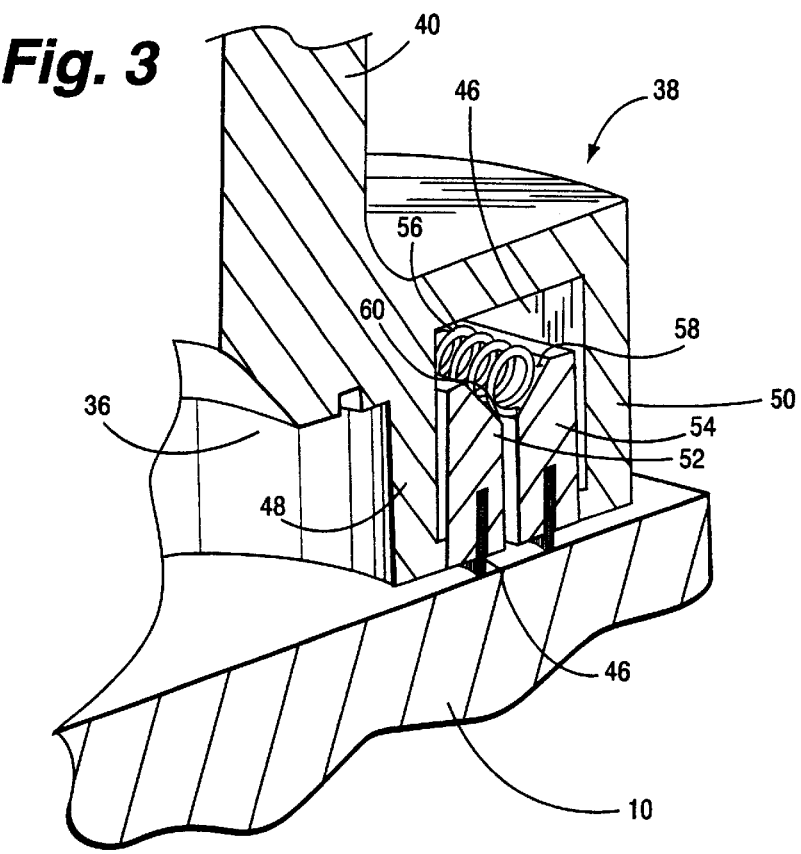
FIG. 3 is a fragmentary perspective view of an alternative brush assembly embodying the invention.
Figure 4:
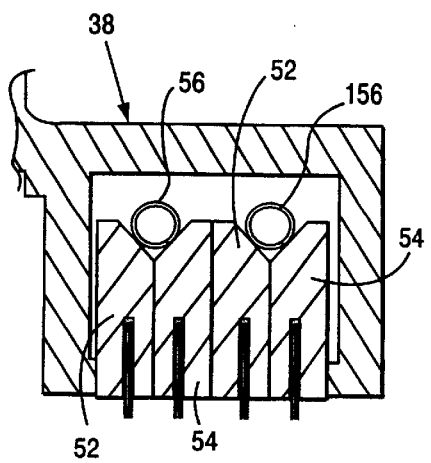
FIG. 4 is an enlarged cross-sectional view of another alternate brush seal assembly embodying the invention.
Figure 5:
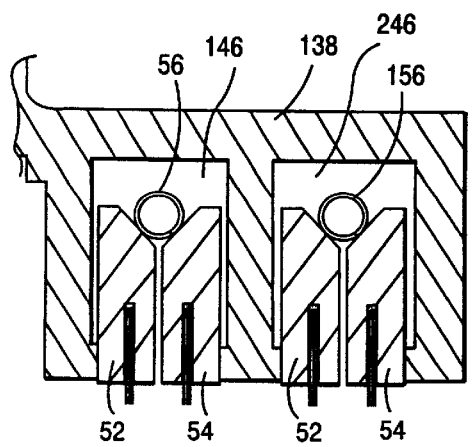
FIG. 5 is an enlarged cross-sectional view showing a further alternate brush seal assembly embodying the invention.

As illustrated by way of example in FIGS. 2–4 there are a variety of brush seal assemblies that may be provided to define a seal arrangement embodying the invention.

In the embodiment of FIGS. 1 and 2, the brush seal assembly 30 is composed of a first brush seal assembly 130 and a second brush seal assembly 230. The second brush seal assembly 230 is disposed between the housing wall 12 and rotor 10 in board of brush seal assembly 130, most adjacent the hydrogen atmosphere cavity 28. It will be appreciated that brush seal 230 acts to minimizes flow not only of hydrogen towards the bearing cavity but also acts to minimize any flow of oil mist from the bearing cavity into the generator cavity.

FIG. 2 illustrates first and second types of brush seal assemblies in greater detail. The first type of brush assembly, exemplified by brush seal assembly 230, is defined as a series of brush seal structures 32, each individually mounted to a single support, e.g., T-shaped support 34. The second type of brush seal assembly, exemplified by brush seal assembly 130, is defined by a series of brush seal structures 32 secured directly or indirectly to a single support 36. The individual brush seal structures 32 may be composed of metal bristles, which have a higher steady state pressure capability, or polymer bristles which have a lower leakage rate. Kevlar is a presently preferred material for forming the bristles. Kevlar is an aromatic polyamide, or aramid, fiber. Kevlar is made from a condensation reaction of para-phenylene diamine and terephthaloyl chloride and has the chemical composition poly para-phenyleneterephthalamide (PPD-T). Polyester or other polymer materials are other possible non-metallic bristle materials.

Although not shown in detail, each brush seal is preferably made by sandwiching bristles between first and second metal plates so as to orient the sandwiched bristles at an angle of about 90° to the surface with which they form a seal. Typically, the bristle diameter ranges from about 0.002 to about 0.01 inch depending on the bristle material, metal or non-metal, temperature, pressure, and operating conditions (static or dynamic). The bristles are typically fabricated either by braising/welding for metal bristles or gluing for non-metal bristles.

Although not illustrated in the schematic representation of FIG. 2, at the lower part of the brush a space may be reserved at each side of the bristles. This allows the bristle to flex and recover during operation. Since this type of brush is capable of sealing positive or negative pressure changes with respect to the axial direction, it is a bi-directional brush. The use of such bi-directional brushes is preferred because it can simplify the manufacturing process and avoid a possible installation error.

The trickle seal may be provided by a combination of metal bristle brush seal assemblies and non-metal, e.g. Kevlar, bristle brush seal assemblies. In a system having metal brush seal structures and Kevlar brush structures, the metal brush seals take more of the pressure drop and the Kevlar brush seals back up the metal seals with a reduced leakage rate.

The brush seal assemblies illustrated in FIGS. 1 and 2 are radially fixed with respect to the casing and one another. In an alternate embodiment of the invention, the brush seal assemblies are defined by seal structures that are spring urged with, e.g., garter springs into engagement with the rotor to improve the seal defined therebetween.

In the embodiment illustrated in FIG. 3, a seal casing 38 is interposed between housing wall 12 and rotor 10. The seal casing 38 comprises an annular plate or wing 40 secured along its outer end by bolts 42 passing through insulation 44 (shown in FIG. 1). The seal casing 38 includes an annular chamber 46 opening radially inwardly toward the rotor 10 and defined between a pair of axially spaced flanges 48 and 50. In the illustrated embodiment, a pair of brush seal structures 52,54 are disposed in casing 38 together with an annular garter spring 56 for biasing the brush seals both axially and radially. In contrast to conventional ring seal assemblies, a lubricant, such as turbine oil need not be supplied to chamber 46, a sufficient seal being instead provided by the spring urged brush seal structures.

In the embodiment illustrated in FIG. 3, first and second brush seal structures 52, 54 are received in a seal case 38 as described hereinabove and each includes an inclined or beveled surface 60, 58, respectively, to receive garter spring 56. In another embodiment, illustrated in FIG. 4, a plurality of brush seal structures 52, 54 are secured together and urged as a unit by a plurality of garter springs 56,156 toward the rotor. In yet another alternative, respective pairs of brush seal structures 52, 54 are each associated with a respective garter spring 56,156 in a respective chamber 146, 246 of a seal casing 138. In the event a spring is inadvertently omitted or fails, then, the remaining brush seal structures and their associated springs will maintain a desired seal with the rotor, rather than providing a potential imbalance, as might occur with one of several springs of a single brush carrier were to fail or be omitted.

As illustrated in FIG. 2, any of the foregoing the brush seal assemblies may be mounted on either side of a step and other rotor extra steps may be introduced into the shaft to minimize perimeter area and peripheral speed at the brush seal. If it is judged that the leakage flow allowed by the brush seal assemblies is sufficiently high to create a potentially explosive condition in the bearing cavity, then the brush seals of the invention may be supplemented in either one or both of two further ways to eliminate the explosive condition. First, at the top of the bearing cavity, a vent 62 (FIG. 1) can be provided. This vent can be fitted with a filter 64 to prevent oil from exiting the unit or a sloped or corkscrew type path (not shown in detail) can be provided to the outlet vent 62 to maximize exiting hydrogen and minimize exiting oil. It is also possible to apply a vacuum to the vent outlet 62 to better direct hydrogen out of the bearing cavity.

A second remedy for hydrogen leakage, which would only be utilized with the above mentioned vent system, is to introduce ambient, shop air to create a positive pressure environment in the bearing cavity. Introducing a positive pressure into that cavity will continuously dilute the flow of hydrogen and prevent an explosive mixture from forming.

Yet a further alternative, as schematically shown in FIG. 1, is to add fan blade(s) 66 directly to the shaft 10 in the bearing cavity 22 to guarantee flow circulation, as shown by dashed air flow lines 68, and dissipation of leaked hydrogen, if any.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a hydrogen cooled generator having a rotor, a housing wall having a hydrogen atmosphere on one side, and a bearing in a bearing cavity containing a fluid on an opposite side of the housing wall, a seal including at least one brush seal assembly between said rotor and said housing wall for substantially segregating the hydrogen atmosphere and fluid in the bearing cavity from one another, comprising:

a seal case between said wall and said rotor;

a plurality of brush seal structures carried by said seal case and having bristles engaging said rotor; and at least one spring member urging said brush seal structures towards said rotor.

2. The seal of claim 1, wherein said brush seal structures of said case are secured together so as to move together.

3. The seal of claim 1, wherein said brush seal structures of said case are free from fixed mechanical attachment so as to be radially displaceable relative to one another.

4. The seal of claim 1, wherein said seal case has at least one radially inwardly open chamber defined therein, said plurality of brush seal structures being disposed in each said chamber.

5. The seal of claim 4, wherein there are at least two, axially adjacent chambers defined in said seal case.

6. The seal of claim 1, wherein each said spring member comprises a garter spring engaged with a radially outer peripheral surface of at least one said brush seal structure.

7. In a hydrogen cooled generator having a rotor, a housing wall having a hydrogen atmosphere on one side, and a bearing cavity on an opposite side thereof, a seal including first and second brush seal assemblies for substantially preventing passage of the hydrogen from said hydrogen atmosphere on one side of said brush seal assemblies into said bearing cavity, each said brush seal assembly including a support secured to said housing wall and a plurality of brush seal structures each of which has a plurality of bristles, tips of said bristles engaging said rotor.

8. A seal according to claim 7, wherein said brush seal structures of at least one said brush seal assembly are disposed in substantially side by side abutting relation.

9. A seal according to claim 8, wherein said support of at least one said brush seal assembly is indirectly coupled to at least one said brush seal structure thereof.

10. A seal according to claim 7, wherein said brush seal structures of at least one said brush seal assembly are disposed in substantially side by side spaced apart relation.

11. A seal according to claim 10, wherein the support of at least one said brush seal assembly is engaged with each said brush seal structure thereof.

12. A seal according to claim 11, wherein said support is generally T-shaped.

13. A seal according to claim 7, wherein the rotor is stepped between said first and second brush seal assemblies.

14. A seal according to claim 7, wherein the bristles of at least one said brush seal assembly are formed from metal.

15. A seal according to claim 7, wherein the bristles of at least one said brush seal assembly are formed from a polymer material.

16. A seal according to claim 7, wherein the bristles of at least one said brush seal assembly are formed from aromatic polyamide fibers.

17. A seal according to claim 7, wherein the bristles of one of said brush seal assemblies are formed from metal and the bristles of the other of said brush seal assemblies are formed from aromatic polyamide fibers.

18. A seal according to claim 7, further comprising an outlet vent defined through a wall of said bearing cavity.

19. A seal according to claim 18, further comprising a filter media disposed in said outlet vent.

20. In a hydrogen cooled generator having a rotor, a housing wall having a hydrogen atmosphere on one side, and a bearing cavity on an opposite side thereof, a method of forming a seal to minimize passage of hydrogen from said hydrogen atmosphere into said bearing cavity, comprising:

providing at least one brush seal assembly, each said brush seal assembly comprising a plurality of axially adjacent brush seal structures each of which has a plurality of bristles and a brush seal structure support; and securing said support of each said brush seal assembly to said housing wall so that tips of said bristles engage said rotor.

21. A method as in claim 20, wherein a vent outlet is defined through a wall defining said bearing cavity, and further comprising the step of applying a vacuum to the vent outlet to draw hydrogen out of the bearing cavity.

22. A method as in claim 20, wherein a vent outlet is defined through a wall defining said bearing cavity, and further comprising the step of introducing ambient air to create a positive pressure environment in the bearing cavity.

23. A method as in claim 20, wherein a vent outlet is defined through a wall defining said bearing cavity, and further comprising providing fan blades on a portion of said rotor disposed in said bearing cavity for inducing a circulation of air through said bearing cavity.

* * * * *